United States Patent
Biesemann

(10) Patent No.: US 10,191,658 B2
(45) Date of Patent: Jan. 29, 2019

(54) LIFECYCLE FOR OFFLINE DATA

(71) Applicant: SAP SE, Walldorf (DE)

(72) Inventor: Thomas Biesemann, Bad Schienborn (DE)

(73) Assignee: SAP SE, Walldorf (DE)

( * ) Notice: Subject to any disclaimer, the term of this patent is extended or adjusted under 35 U.S.C. 154(b) by 134 days.

(21) Appl. No.: 15/378,647

(22) Filed: Dec. 14, 2016

(65) Prior Publication Data

US 2018/0165013 A1 Jun. 14, 2018

(51) Int. Cl.
*G06F 3/06* (2006.01)
*H04M 1/725* (2006.01)

(52) U.S. Cl.
CPC .......... *G06F 3/0608* (2013.01); *G06F 3/0652* (2013.01); *G06F 3/0653* (2013.01); *G06F 3/0673* (2013.01); *G06F 3/0649* (2013.01); *H04M 1/72522* (2013.01)

(58) Field of Classification Search
CPC ...... G06F 3/0608; G06F 3/0649; G06F 3/652; G06F 3/0653; G06F 3/0673; H04M 1/72522
USPC .......................................... 711/166, 160, 161
See application file for complete search history.

(56) References Cited

U.S. PATENT DOCUMENTS

| | | |
|---|---|---|
| 2010/0082497 A1 | 4/2010 | Biesemann et al. |
| 2012/0047079 A1 | 2/2012 | Biesemann et al. |
| 2014/0006232 A1 | 1/2014 | Viehweger et al. |
| 2015/0373116 A1* | 12/2015 | Mo ....................... G06F 3/0608 709/219 |
| 2016/0349967 A1* | 12/2016 | Ericsson ............. G06F 3/04842 |

* cited by examiner

*Primary Examiner* — Shane D Woolwine
(74) *Attorney, Agent, or Firm* — Fish & Richardson P.C.

(57) ABSTRACT

Techniques are described for managing lifecycles of offline data on mobile devices. In some implementations, offline data instances stored at a mobile device are monitored based on a set of memory management rules. A memory management process maintains an offline data instance table identifying each of the set of monitored offline data instances stored at the mobile device and associates each instance with a timestamp identifying a most recent time of access satisfying at least one access type as defined in the set of memory management rules. In response to determining that a trigger associated with performing a memory management process has occurred, a period of time parameter from a last access corresponding to deletion is identified. The parameter is compared to a current time and the most recent time of access for each instance, and instances where the comparison meets or exceeds the period of time parameter are deleted.

12 Claims, 5 Drawing Sheets

| Name of Data Object | Object Instance ID | Timestamp - Creation | Timestamp - Last_Used |
|---|---|---|---|
| Purchase_Order | 1586 | 2017-06-12 | 2017-10-23 |
| Contract | 0081 | 2017-04-10 | 2017-11-11 |
| Sales_Order | 2941 | 2017-03-15 | 2017-04-01 |
| Purchase_Order | 0146 | 2017-01-30 | -- |

| Name of Data Object | Role | Expiration Period |
|---|---|---|
| Sales_Order |  | 3 months |
| Sales_Order | Sales Representative | 6 months |
| Contract |  | 2 months |

235 / 240 / 245

LIFECYCLE FOR OFFLINE DATA

BACKGROUND

The present disclosure relates to a system and computerized method for managing the lifecycle of offline data stored at mobile and other devices.

Modern cloud-based software applications work with and can be accessed on mobile devices, and can support an offline mode without network connectivity. Before working offline, metadata and software-specific data (e.g., data objects, such as sales orders, accounts, business partners, service requests, etc.) need to be synchronized to the user interface. To select which data is available for offline usage, various mechanisms may be used, including, for example, predefined queries to particular data sets or an identification of particular instance of data to be updated for offline use on a particular user's or set of user's mobile devices. As an example, if a sales representative knows that he or she will be on a customer visit for a particular set of days, the required customer-related data can be downloaded prior to the visit to continue working offline at the customer site should internet connectivity be unavailable or poor.

SUMMARY

Implementations of the present disclosure are generally directed to managing the lifecycle of offline data stored at mobile and other devices. In one example implementation, a computerized method executed by hardware processors can be performed. The example method can comprise monitoring a set of offline data instances stored at a mobile device associated with a mobile application, where the mobile application is associated with a set of memory management rules for offline data instances. A memory management process associated with the mobile application can maintain an offline data instance table that identifies each of the set of monitored offline data instances stored at the mobile device. Each of the offline data instances can be associated with a timestamp within the table that identifies a most recent time of access of a corresponding offline data instance. In some instances, the most recent time of access can correspond to a most recent time of access where the access satisfies at least one access type as defined in the set of memory management rules. In response to determining that a trigger associated with performing a memory management process has occurred, additional operations can be performed. The memory management process can identify, from the memory management rules, a period of time parameter since a last access of individual data instances that corresponds to a deletion action. The identified period of time parameter can then be compared to a current time and the most recent time of access for each of the set of offline data instances. At least a subset of the set of offline data instances can be deleted where the amount of time since the most recent time of access for particular offline data instances meets or exceeds the period of time parameter.

Implementations can optionally include one or more of the following features. In some instances, at least some of the offline data instances comprise data objects. In some instances, the most recent time of access is associated with a user's interaction, at the mobile device, with a particular user interface (UI) associated with the offline data instance. In those instances, the at least one access type defined in the set of memory management rules can corresponding to the most recent access time can comprise accessing a particular UI associated with the offline data instance corresponding to a direct accessing of the offline data instance. In some instances, at least one access type is defined in the set of memory management rules as not causing an update to the most recent time of access. In some instances, the type of access associated with a particular offline data instance is determined based on metadata associated with a user interface in which the particular offline data instance is accessed.

In some instances, each offline data instance is further associated with a timestamp identifying an original creation date at the mobile device of the corresponding offline data instance. In those instances, the method may further comprise, in response to determining that a trigger associated with performing a memory management process has occurred based on the set of memory management rules, identifying a threshold age of particular offline data instances corresponding to a deletion action. The identified threshold age is compared to a current age for each of the set of offline data instances based on their respective creation timestamp or the most recent time of access. At least a subset of offline data instances are deleted where the age of a particular offline data instance meets or exceeds the identified threshold age of the particular offline data instances.

In some instances, deleting at least a subset of the set of offline data instance comprises deleting each of the set of offline data instances where the amount of time since the most recent time of access for a particular offline data instance meets or exceeds the period of time parameter.

In a second example implementation, a system comprising at least one processor and a memory communicatively coupled to the at least one processor is provided, where the memory stores instructions which, when executed, cause the at least one processor to perform operations. In the example system, the operations can comprise monitoring a set of offline data instances stored at a mobile device associated with a mobile application, where the mobile application is associated with a set of memory management rules for offline data instances. A memory management process associated with the mobile application can maintain an offline data instance table that identifies each of the set of monitored offline data instances stored at the mobile device. Each of the offline data instances can be associated with a timestamp within the table that identifies a most recent time of access of a corresponding offline data instance. In some instances, the most recent time of access can correspond to a most recent time of access where the access satisfies at least one access type as defined in the set of memory management rules. In response to determining that a trigger associated with performing a memory management process has occurred, additional operations can be performed. The memory management process can identify, from the memory management rules, a period of time parameter since a last access of individual data instances that corresponds to a deletion action. The identified period of time parameter can then be compared to a current time and the most recent time of access for each of the set of offline data instances. At least a subset of the set of offline data instances can be deleted where the amount of time since the most recent time of access for particular offline data instances meets or exceeds the period of time parameter.

Implementations can optionally include one or more of the following features. In some instances, at least some of the offline data instances comprise data objects. In some instances, the most recent time of access is associated with a user's interaction, at the mobile device, with a particular user interface (UI) associated with the offline data instance. In those instances, the at least one access type defined in the set of memory management rules can corresponding to the most recent access time can comprise accessing a particular UI associated with the offline data instance corresponding to a direct accessing of the offline data instance. In some instances, at least one access type is defined in the set of memory management rules as not causing an update to the most recent time of access. In some instances, the type of access associated with a particular offline data instance is determined based on metadata associated with a user interface in which the particular offline data instance is accessed.

In some instances, each offline data instance is further associated with a timestamp identifying an original creation date at the mobile device of the corresponding offline data instance. In those instances, the operations may further comprise, in response to determining that a trigger associated with performing a memory management process has occurred based on the set of memory management rules, identifying a threshold age of particular offline data instances corresponding to a deletion action. The identified threshold age is compared to a current age for each of the set of offline data instances based on their respective creation timestamp or the most recent time of access. At least a subset of offline data instances are deleted where the age of a particular offline data instance meets or exceeds the identified threshold age of the particular offline data instances.

In some instances, deleting at least a subset of the set of offline data instance comprises deleting each of the set of offline data instances where the amount of time since the most recent time of access for a particular offline data instance meets or exceeds the period of time parameter.

In a third example implementation, a non-transitory computer-readable storage medium storing instructions which, when executed, cause at least one processor to perform operations is provided. In the example medium, the operations can comprise monitoring a set of offline data instances stored at a mobile device associated with a mobile application, where the mobile application is associated with a set of memory management rules for offline data instances. A memory management process associated with the mobile application can maintain an offline data instance table that identifies each of the set of monitored offline data instances stored at the mobile device. Each of the offline data instances can be associated with a timestamp within the table that identifies a most recent time of access of a corresponding offline data instance. In some instances, the most recent time of access can correspond to a most recent time of access where the access satisfies at least one access type as defined in the set of memory management rules. In response to determining that a trigger associated with performing a memory management process has occurred, additional operations can be performed. The memory management process can identify, from the memory management rules, a period of time parameter since a last access of individual data instances that corresponds to a deletion action. The identified period of time parameter can then be compared to a current time and the most recent time of access for each of the set of offline data instances. At least a subset of the set of offline data instances can be deleted where the amount of time since the most recent time of access for particular offline data instances meets or exceeds the period of time parameter.

Implementations can optionally include one or more of the following features. In some instances, at least some of the offline data instances comprise data objects. In some instances, the most recent time of access is associated with a user's interaction, at the mobile device, with a particular user interface (UI) associated with the offline data instance. In those instances, the at least one access type defined in the set of memory management rules can corresponding to the most recent access time can comprise accessing a particular UI associated with the offline data instance corresponding to a direct accessing of the offline data instance. In some instances, at least one access type is defined in the set of memory management rules as not causing an update to the most recent time of access. In some instances, the type of access associated with a particular offline data instance is determined based on metadata associated with a user interface in which the particular offline data instance is accessed.

In some instances, each offline data instance is further associated with a timestamp identifying an original creation date at the mobile device of the corresponding offline data instance. In those instances, the operations may further comprise, in response to determining that a trigger associated with performing a memory management process has occurred based on the set of memory management rules, identifying a threshold age of particular offline data instances corresponding to a deletion action. The identified threshold age is compared to a current age for each of the set of offline data instances based on their respective creation timestamp or the most recent time of access. At least a subset of offline data instances are deleted where the age of a particular offline data instance meets or exceeds the identified threshold age of the particular offline data instances.

In some instances, deleting at least a subset of the set of offline data instance comprises deleting each of the set of offline data instances where the amount of time since the most recent time of access for a particular offline data instance meets or exceeds the period of time parameter.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 2A and 2B represent an example offline data instance tables for use in managing offline data lifecycles.

DETAILED DESCRIPTION

Figure 1:
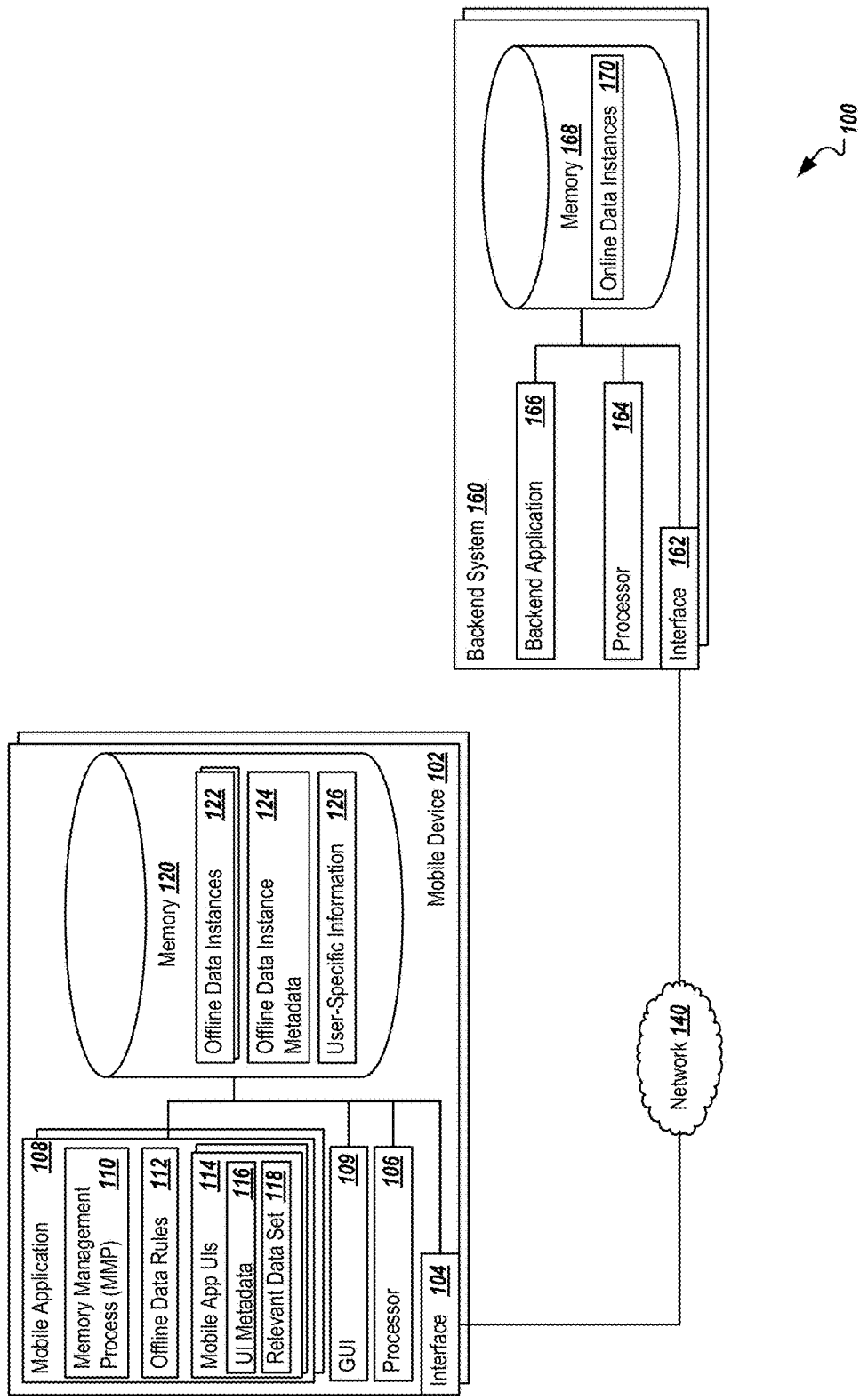
FIG. 1 is a block diagram illustrating an example system for implementing a lifecycle management process for mobile devices.

The present disclosure describes systems and methods for managing the lifecycle of offline data stored at mobile and other devices. Specifically, an intelligent memory management process is provided to ensure that mobile devices, having a relatively limited amount of storage as compared to desktop and server systems, can successfully manage database and data storage on the device without the need for users to specifically identify information to be maintained and/or removed. In previous systems, as more and more data is stored on the mobile device over time, the available space will be exceeded and the mobile application(s) associated with that data may stop working. In some instances, a certain amount of storage may be dedicated to a particular software application, such as a mobile application associated with an enterprise or business system. In those instances, the maximum amount of storage space allocated to that mobile application may be significantly smaller than the total amount of storage at the mobile device, such that data must be actively managed in order to provide the relevant information when users are in an offline state.

In the present disclosure, the mobile application stores can store data instances loaded from the backend system during online interactions with the backend system. The data instances can be loaded for editing and/or read-only scenarios where a copy of the data instance may be stored, or cached, on the mobile device. In addition to the data instances themselves, the mobile device can be provided or store a database, table, or other suitable storage mechanism that can manage a set of metadata information describing the data instances (e.g., name, specific reference ID, etc.) and providing information about the usage and storage timeline of the data instances (e.g., time of download, last interaction with data, etc.). In some instances, the information may be included in the stored data instance, while in others, the metadata information may be stored apart from the data instances.

A set of rules can be defined and enforced by the memory management process. In some instances, the rules may be triggered based on a particular threshold amount of available storage being used, either in the device or the memory associated specifically with the mobile application. Alternatively or additionally, age-based memory management may be performed outside of any issues identified or threshold memory amounts being met. In some instances, the age-based management may be based on when particular data instances are downloaded to the device or when the last interaction with the data instance at the mobile device occurred. When triggered, the memory management process can access the metadata associated with the data instances to compare information about those data instances to one or more threshold lengths of time in an analysis of which, if any, of the data instances should be deleted from the mobile device.

Further, in some instances, the type of interaction with a particular data instance or data object stored on the mobile device may determine whether the metadata associated with that data instance or data object is updated. In particular, a timestamp for creation of the data object or data instance may be updated whenever the data object or data instance is downloaded to the mobile device. A second timestamp may be available for when the data object or data instance was last used or interacted with. In particular, the second timestamp may only be written where a direct interaction or presentation of data included within the data object or data instance occurs, and not where a summary or general listing of the data object or data instance occurs. For example, each data instance may be associated with a detailed data object, where the detailed data object includes specific information associated with that instance of the data object. In instances where the data object is viewed in a detailed manner, the last used timestamp may be reset to the current time. In some instances, a summary presentation or overview, e.g., an object worklist, may be presented on the mobile device, such as where a general list of objects associated with the mobile application may be presented. In those instances, where only the inclusion within an object worklist occurs and not a detailed view of the data object or instance, the last used timestamp may not be reset, as the information included within the data object or instance was not specifically viewed or interacted with by the user of the mobile device. In this way, when memory management is based at least in part on the last used timestamp, the management is based on the last time a particular data object is specifically used and accessed by the user, not where the data object and its information is included at a high-level without a specific interest or interaction with that data. In some instances, particularly where multiple data objects are associated with a single UI or presentation of information, the UI or presentation itself may identify a leading or primary object associated with the UI. In those instances, even where some peripheral information about other data objects or instances are included in the UI, only the leading or primary data object may have its last used timestamp updated.

In some instances, users may be associated with different roles. In those particular roles, some information within the mobile application and associated with the backend application may be known to be more important to users, such that the memory management rules take such roles into consideration. For example, a salesman may be more interested in sales order-related data objects than another user, such that the memory management rules used may have a longer invalidation period for sales order data objects as compared to other data objects accessed at the mobile device. In such instances, when an analysis is performed to determine one or more data objects to be removed from the mobile device, the sales order data objects may require a greater relative age than other types of data objects before they are deleted (e.g., 4 months vs 2 months). When evaluating the metadata, the memory management process can delete other data objects when they have aged two months or more, but, for example, may not delete sales order data objects until they have not been accessed for over 4 months. Similarly, users may specify particular information or data objects to be retained or prioritized, such that the memory management process can consider and apply those preferences in comparative decisions to delete particular data objects and instances.

Turning to the illustrated implementation, FIG. 1 is a block diagram illustrating an example system 100 for implementing a lifecycle management process for mobile devices. As illustrated in FIG. 1, system 100 is a client-server and device-client system capable of sharing and communicating information across a set of devices (e.g., one or more mobile devices 102 and one or more backend systems 160 via network 140). In some implementations, only one backend system 160 (associated with a particular mobile application 108) may be configured to take advantage of the processes described herein, while in other instances, multiple systems 160 may interact with multiple mobile applications 108. Although components are shown individually, in some implementations, functionality of two or more components, systems, or servers may be provided by a single component, system, or server.

As used in the present disclosure, the term "computer" is intended to encompass any suitable processing device. For example, both mobile device 102 and backend system 160 may be any computer or processing device such as, for example, a blade server, general-purpose personal computer (PC), Mac®, workstation, UNIX-based workstation, or any other suitable device. Moreover, although FIG. 1 illustrates a single backend system 160, backend system 160 can be implemented using two or more systems, as well as computers other than servers, including a server pool. In other words, the present disclosure contemplates computers other than general purpose computers, as well as computers without conventional operating systems. Similarly, the mobile device 102 may be any system which can receive data instances from the backend system 160 and decide, when triggered, to perform a memory management process. The mobile device 102 can include any suitable mobile device, including smartphones, tablets, smartwatches, or any other suitable mobile computing device. In general, each illustrated component may be adapted to execute any suitable operating system, including Linux, UNIX, Windows, Mac OS®, Java™, Android™, Windows Phone OS, or iOS™, among others.

In general, the mobile device 102 is used as a particular device upon which one or more mobile applications 108 are executed, where at least one of the mobile applications 108 is associated with at least one backend application 166 (or any other data source), from which one or more data instances (or data objects) can be downloaded at the mobile device 102 for offline use. The mobile device 102 comprises an electronic computing device operable to receive, transmit, process, and store any appropriate data associated with environment 100 of FIG. 1, particularly with information obtained from and shared with one or more backend applications 166, where at least some of that information can be and is used in an offline manner.

As illustrated, mobile device 102 includes an interface 104, a processor 106, one or more mobile applications 108, a GUI 109, and memory 120. The interface 104 is used by the mobile device 102 for communicating with other systems in a distributed environment—including within the environment 100—connected to the network 140, e.g., backend system 160, as well as other systems communicably coupled to the network 140. Generally, the interface 104 comprises logic encoded in software and/or hardware in a suitable combination and operable to communicate with the network 140. More specifically, the interface 104 may comprise software supporting one or more communication protocols associated with communications such that the network 140 or interface's hardware is operable to communicate physical signals within and outside of the illustrated environment 100. Still further, the interface 104 may allow the mobile device 102 to communicate with the backend system 160 to download data instances that will later be operated upon in memory management processes described in the present disclosure.

Network 140 facilitates wireless or wireline communications between the components of the environment 100 (e.g., between the mobile device 102 and the backend system 160), as well as with any other local or remote computer, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the backend system 160) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations. The network 140 may not always be accessible to the mobile device 102, which is why the mobile application(s) 108 allow at least some of the data instances used in the mobile application 108 to be downloaded to the mobile device 102, such that offline or unconnected usage of the data may be available.

As illustrated in FIG. 1, the mobile device 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the mobile device 102. Specifically, the processor 106 executes the algorithms and operations described in the illustrated figures, including the operations performing the functionality associated with the mobile device 102 generally, as well as the various software modules (e.g., the mobile application 108), including the functionality for sending communications to and receiving transmissions from the backend system 160, as well as to other mobile devices and systems.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Mobile device 102 executes a mobile application 108 operable to perform any suitable functionality for the mobile device 102. In some instances, particular mobile applications 108 may be associated with one or more backend applications 166 executed at backend system 160, such an enterprise or business-related application. In some instances, the mobile application 108 may be a dedicated application associated with the backend application 166, while in others, the mobile application 108 may be a web browser or other general application used to access information associated with the backend application 166, along with at least one other system or provide additional capabilities. The functionality of the mobile application 108 can include presentation of various user interfaces (UIs) 114 via the GUI 109 of the mobile device 102, where each UI 114 is associated with a particular set of data 118 and metadata 116 provided by the backend application 166 and its online (or live/current) data instances 170. In some instances, the UI metadata 116 can identify a particular leading or primary data object or data instance associated with a particular UI 114. Information about the relevant data set 118 presented to the user in a particular interaction can be stored in a set of offline data instances 122 stored at memory 120. In association with those stored offline data instances 122, corresponding sets of offline metadata 124 associated those data instances 122 can be stored in memory 120. The offline data instance metadata 124 can include and store information identifying a name of a particular data instance (e.g., a name of a data object), an identifier associated with the particular data instance (e.g., a GUID or other reference uniquely identifying a particular instance of a data object), a first timestamp in which the offline data instance 122 was initially created as an offline data instance 122, and a second timestamp identifying the last specific interaction with the underlying data instance 122 (either offline or online interactions of a particular predefined interaction type). In some instance, a memory management process 110 included in or associated with the mobile application 108 can manage the storage of the offline data instances 122 and any updates to the offline data instance metadata 124 as those data instances are initially presented or later interacted with via the mobile app UIs 114 in an online and/or offline situation.

As noted, the memory management process (MMP) 110 of the mobile application 108 represents an intelligent memory manager, where the MMP 110 accesses a set of defined offline data rules 112 that can be used to ensure that the memory allocated to the mobile application 108 is used in a manner that avoids issues with size and aging. In some instances, the mobile application 108 and its offline data instances 122 may be assigned or limited to a particular portion of memory 120 in which data can be stored. In other instances, the mobile application 108 and its offline data instances 122 may use as much of the mobile device's memory 120 as needed. The offline data rules 112 can define how the MMP 110 monitors that data storage, and, upon identifying a particular storage threshold is met (e.g., 80% of the available storage is used), can initiate an analysis and cleaning up of the offline data instances 122 based on information stored in the metadata 124. In particular, the offline data rules 112 may define a set of memory management rules for managing the offline data instances 122. For example, the rules may identify a relevant time period of non-access of offline data instances 122 that is used as a threshold for removing particular offline data instances 122 from memory 120 after the memory cleanup is triggered. The triggering of the memory cleanup may be defined in the offline data rules 112 as well, where the MMP 110 triggers the cleanup after the storage threshold is matched or exceeded. In some instances, age-based cleanup actions may be performed periodically or in addition to the cleanup. The offline data rules 112 can define when the age-based cleanup is performed, where the age-based cleanup is based on either the initial creation of the data instance 122 in the mobile device 102 or the last use of the instance 122. The MMP 110 can access the offline data instance metadata 124 to determine which, if any, of the data instances 122 should be deleted from the mobile device 102.

In some instances, the offline data rules 112 may also define the types of interactions associated with particular data instances or data objects via the mobile application's UIs 114, where only certain types of interactions may result in the metadata 124 being updated to indicate a new last used timestamp. For example, an interaction with a UI 114 providing an overview or listing of multiple data instances that does not provide details associated with a particular data instance may not cause a new timestamp to be added or updated in the last used timestamp. In some instances, the MMP 110 can access the UI metadata 116 of the UI 114 to determine the type of interaction being performed and, based on the interaction type (e.g., an object worklist presenting high-level information related to a set of data objects versus a detailed view of a particular data object), determine whether the last used timestamp associated with a particular data instance should be updated. If no entry in the offline data instance metadata 124 exists for a particular data instance, the metadata 124 can be updated with a new entry (including a timestamp of the data instance's creation) along with the data instance being stored in the set of offline data instances 122.

A set of user-specific information 126 may identify a particular role of the user associated with the mobile device 102. Those roles may define variations on how particular types of offline data instances 122 are handled within the offline data rules 112. For example, for data instances that are particularly relevant to the roles associated with the user, different age-based thresholds may be used before removing the relevant data instances 122 from memory 120. Conversely, data instances of types known to be less relevant to the role may be removed at earlier thresholds. In some instances, based on the knowledge that particular data instances for a role are time-sensitive (e.g., data is stale after a short period), some data objects relevant to the role of the user associated with the mobile device 102 may have shortened thresholds such that the offline data instances 122, while relevant to the user, are removed at a relatively earlier time than normal. Additionally, the user-specific information 126 may include an identification of particular information identified by the user of the mobile device 102 that should not be removed during a cleanup process, or that should take priority over other data/information during cleanups. Such indications may be possible through the mobile application 108 and its functionality, including during presentation of particular mobile application UIs 114.

As illustrated, mobile device 102 includes GUI 109. The GUI 109 interfaces with at least a portion of the environment 100 for any suitable purpose, including generating a visual representation of a particular mobile application 108. In particular, the GUI 109 may be used to view and navigate various Web pages located both internally and externally to environment 100, as well as to view and navigate through information accessed by the mobile application 108, such as information stored at or associated with a particular backend application 166 (e.g., one or more of the mobile application UIs 114), among others. Generally, the GUI 109 provides the user with an efficient and user-friendly presentation of data provided by or communicated within the system. The GUI 109 may comprise a plurality of customizable frames or views having interactive fields, pull-down lists, and buttons operated by the user. For example, the GUI 109 may provide interactive elements that allow a user to view or interact with information related to the operations of the process associated with the mobile application 108. In general, the GUI 109 is often configurable, supports a combination of tables and graphs (bar, line, pie, status dials, etc.), and is able to build real-time portals and presentations, where tabs are delineated by key characteristics (e.g., site or micro-site).

Therefore, the GUI 109 contemplates any suitable graphical user interface, such as a combination of a generic web browser, intelligent engine, and command line interface (CLI) that processes information in the platform and efficiently presents the results to the user visually.

Memory 120 of the mobile device 102 may represent a single memory or multiple memories. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data (e.g., the offline data instances 122 and associated metadata 124), including financial data, user information, administrative settings, password information, caches, applications, backup data, repositories storing business and/or dynamic information, and any other appropriate information associated with the mobile device 102 including any parameters, variables, algorithms, instructions, rules, constraints, or references thereto. Additionally, the memory 120 may store any other appropriate data, such as VPN applications, firmware logs and policies, firewall policies, a security or access log, print or other reporting files, as well as others. For example, memory 120 can store, as illustrated, the set of offline data instances 122, the offline data instance metadata 124, and user-specific information 126, as described previously.

As illustrated, FIG. 1 includes one or more backend systems 160. Each backend system 160 can be associated with one or more backend applications 166 that can interact with the mobile applications 108 stored on the mobile device 102. Those backend systems 160 may be any type of system providing particular mobile functionality via the mobile application 108, including enterprise resource planning (ERP) systems, customer relationship management (CRM) systems, human capital management (HCM) systems, supplier relationship management (SRM) systems, supply chain management (SCM) systems, product lifecycle management systems, financial management (FM) systems, analytic systems, and data management systems, among others. Those systems may be associated with backend applications 166 which provide functionality and interactivity based on the set of online data instances 170 associated with active data instances and data objects used in the corresponding backend system 160. The mobile applications 108 corresponding to particular backend systems 160 can access functionality of the backend applications 166 and the online data instances 170. When those data instances 170 are provided to the mobile application 108, the mobile application 108, as described, can store copies of the relevant data sets 118 and data instances 122 at the mobile device 102 for offline use.

As illustrated, each backend system 160 includes an interface 162, a processor 164, a backend application 166, and memory 168, which may each be similar to or different than the interface 104, processor 106, and memory 120 described in relation to mobile device 102. Interface 162 provides the backend system 160 with communications to the components and systems of environment 100, including the ability to communicate with the mobile device 102 and mobile application 108, or any other systems or computers via network 140. In general, processor 164 executes instructions and manipulates data to perform the operations of the backend system 160, including the operations related to execute of the backend application 166. Memory 168 may be similar to or different than memory 120, and as illustrated, can include the online data instances 170.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

FIGS. 2A and 2B represent an example offline data instance table 200 (or metadata table) and an example expiration table 230 for use in managing offline data lifecycles. In particular, FIG. 2A may represent an example set of offline data instance metadata associated with the one or more offline data instances stored at a mobile device. As illustrated, the table 200 includes four (4) columns, a name of the data object column 205, an object instance ID 210, a creation timestamp column 215, and a last_used timestamp column 220. Each time a particular data object is used on the mobile device, the particular data object can be stored locally for use offline. During the storage process, the particular data object can be associated with a new entry if the data object has not been used previously. In those instances, the name of the data object, the specific object instance ID, and the creation timestamp can be added to the metadata table 200. If a particular object being used or interacted with in the mobile application of a suitable interaction type has already been used and stored at the mobile device, the last_used timestamp can be updated with the timestamp of the use. In some instances, the last_used timestamp may be initially set to the creation timestamp and updated after further usage and/or interaction at the mobile device. Additional and/or alternative columns and data may be included in alternative metadata tables 200, as well as additional tables 200 to those illustrated. Further, different formats for storing the metadata may be used as appropriate.

In one example, additional tables or columns may be provided. In the example, information associated with each data object may be provided, such that an expiration period for particular data objects may be specifically indicated. The expiration table 230 of FIG. 2B illustrates how a role-based rule set can be used to provide user-and role-specific operations and memory management. As noted, the time to delete particular information may vary based on both the information type and the user's interest or need for the data. In these instances, the expiration period 245 of particular named data objects 235 is provided, along with any role-specific modifications 240 to those expirations. Based on the illustrated table, if not used or accessed at the mobile device within 3 months, standard Sales Order data objects will be deleted after three (3) months. However, if the user is associated with a sales representative role, Sales Order data objects will not be deleted until after six (6) months have passed. In other words, the rule in the second Sales Order entry overrides the general rule, and is used in Sales Representative-specific instances. In the illustrated example, Contract data objects, regardless of the user and the role, may be deleted after 2 months. In some instances, if no specific entry is included in the expiration table 230, a generic or default expiration period (e.g., 4 months, etc.) may be used for other data objects.

The MMP 110 of FIG. 1, for example, can be triggered to perform a memory management process in response to a determination that a triggering event has occurred (e.g., that the memory is full past a predetermined threshold). The MMP 110 can access the table 200 to identify whether any of the particular stored data instances (here, data objects) have not been used within a particular amount of time. In some instances, that amount may be predetermined, while in others, the various last_used times may be compared relative to one another to determine which of the data objects to delete. Additionally, in some instances, the MMP 110 may trigger an age-based memory management process, even where no other triggering event has occurred and/or in addition to the standard process. In those instances, an evaluation of the particular creation timestamps and/or the last_used timestamps may be performed to identify one or more data objects to be removed.

In the illustrated example, assuming the triggering event occurs in December 2017, the data object entitled Purchase_Order with the Object Instance ID of "0146" may be deleted in some instances, as the data object was initially created in January 2017 and was not used since. If a 3-month window is associated with the last_used analysis, then the Purchase_Order data object (Object Instance ID "1586") and the Contract data object (Object Instance ID "0081") may not be removed, whereas the Sales_Order data object (Object Instance ID "2941") may be removed based on its last_used timestamp of April 2017 along with the other Purchase_Order data object (Object Instance ID "0146").

Figure 3:
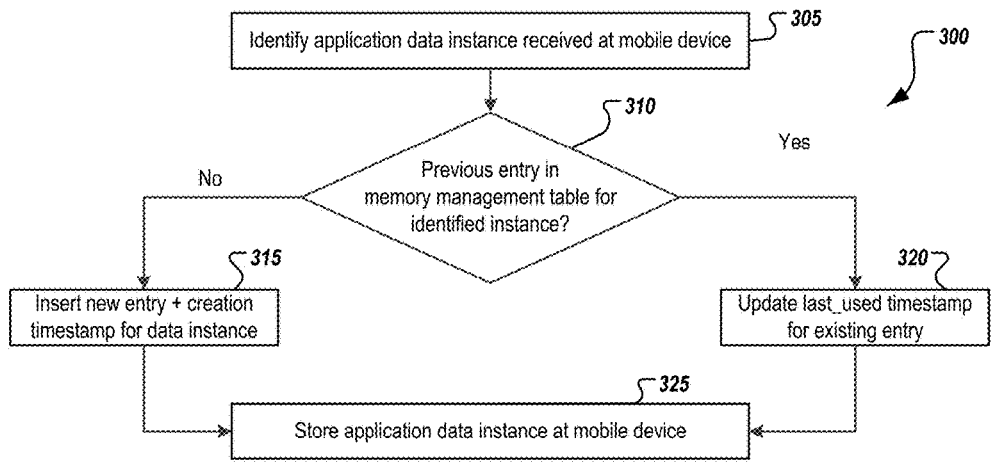
FIG. 3 is a flowchart of example operations associated with creating timestamps for data instances stored at the mobile device.

FIG. 3 is a flowchart of example operations 300 associated with creating timestamps for data instances stored at the mobile device. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, an application data instance received at the mobile device is identified. In some instances, the identification may be performed by a memory management process or a mobile application through which the data instance is received. A determination is made at 310 as to whether a previous entry in a memory management table (e.g., metadata table) for the identified instance has been created. If not, method 300 continues at 315, where a new entry is added to the memory management table with relevant information about the particular identified data instance, and where the new entry includes a creation timestamp. Method 300 continues at 325, where the application data instance is stored at the mobile device (e.g., in memory) for later usage in offline situations, where needed.

Returning to 310, if a previous entry associated with the particular identified instance already exists in memory, then method 310 may continue at 320, where the last_used timestamp associated with the existing entry can be updated to a current timestamp. Once the memory management table is updated, method 300 continues to 325. It is noted that the updating of the last_used timestamp may be a significantly more complicated decision and determination than illustrated in FIG. 3. As such, FIG. 4 illustrates the more detailed analysis for when the last_used timestamp may be updated.

Figure 4:
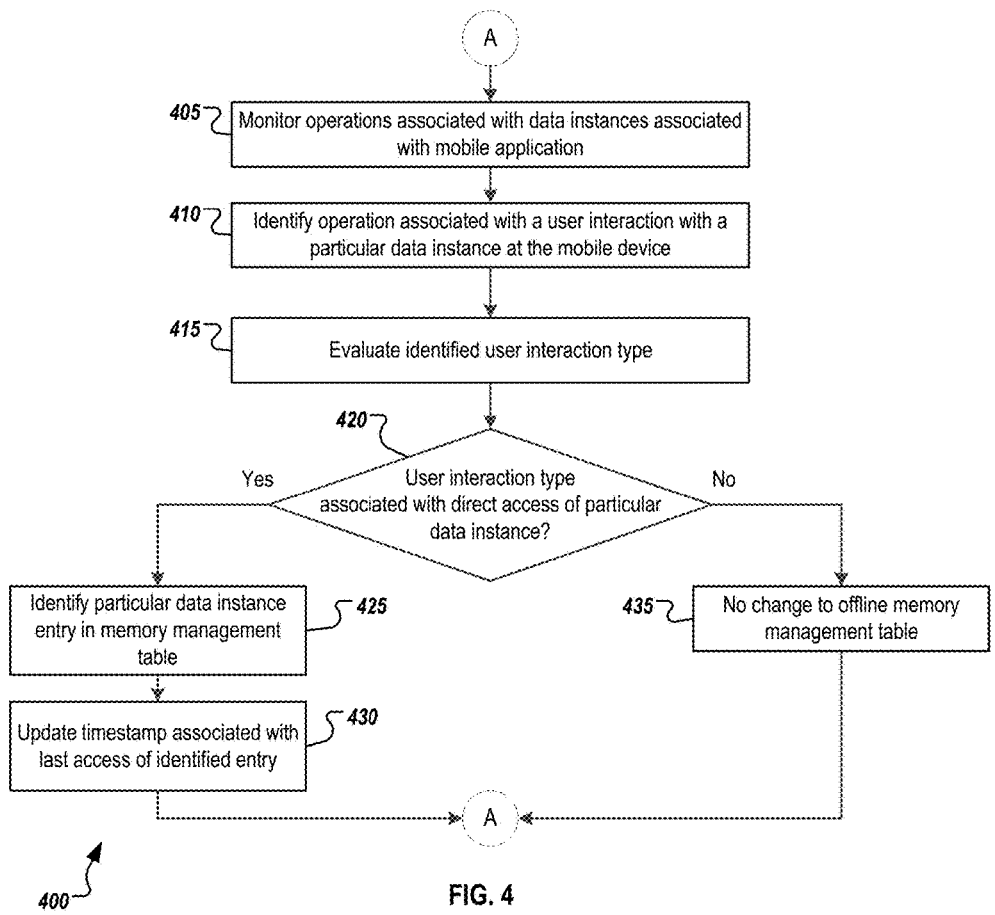
FIG. 4 is a flowchart of example operations associated with updating last_used timestamps for data instances stored at the mobile device.

FIG. 4 is a flowchart of example operations associated with updating last_used timestamps for data instances stored at the mobile device. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a memory management process monitors operations associated with data instances used by and associated with the mobile application at the mobile device. At 410, an operation associated with a user interaction is identified, where the user interaction is associated with a particular data instance. In response to the identification, at 415 the type of user interaction is evaluated. In some instances, this may include analyzing metadata that defines a particular UI accessed by the mobile device. The UI metadata may define, for example, whether the data instances associated with the particular UI relate to a detailed view of or interaction with a particular data instance, or whether the view relates to a general or overview view of a set of data instances without a particular detailed view or interaction with a particular data instance. Alternatively, the evaluation of the user interaction type may instead identify a particular action performed by the user, such as whether the user writes new data in the data instance or if the data instance was merely read. In some instances, multiple data instances may be associated with a particular action or interaction in the mobile application. In those instances, the UI metadata may define or identify one or more particular data instances primarily associated with the data and interaction even though information about or from one or more other data instances may be included. In those instances, the particular data instance recognized as primary may be the only data instance associated with a last_used timestamp update, depending on the level of detail and/or interaction associated with the other data instances.

In some instances, pattern-based UIs may be used and can determine the type of access being performed, along with the particular data object primarily associated with an interaction (if available). In some instances, the UI categories may be predefined and understandable to the mobile application and MMP in determining whether an interaction is a detailed interaction or an overview interaction. For example, three potential UIs may be an Object Work List (OWL) UI, a Quick Create (QC) UI, and a Thing Inspector (TI) UI. The OWL UI may provide an overview of one or more data objects, and may not be defined as a detailed view. The QC UI may be used to create new data instances, and in such cases, may be determined to be a detailed interaction, and may be associated with a creation timestamp upon generation of the new data instance. The TI UIs may be used to view and edit the details of a particular business object instance, and may also be determined as a detailed interaction. Depending on the tyupe of interactions performed, the MMP can determine whether either the creation or last_used timestamps should be updated. During an OWL UI interaction, no update to the last_used timestamp may be made, while during a TI UI interaction, an update to the last_used timestamp should be made. Further, in some instances, TI UI interactions may be determined to be read-only operations with no particular edits or interactions being performed other than general inspection. Depending on the rules in place, the TI UI interaction may, in some instances, not update the last_used timestamp.

Returning to FIG. 4, at 420, a determination is made whether the user interaction type associated with the particular data instance was a direct, or detailed, access of the particular data instance that meets the threshold for updating the last_used timestamp. If so, method 400 continues at 425, where the particular data instance entry in the memory management table is identified. Subsequently, the last_used timestamp associated with the identified entry is updated to the current timestamp at 430. Where changes are made to the data within the data instance, the offline data instance stored at the mobile device can be updated accordingly. Returning to 420, if the user interaction type was not associated with a detailed access of the data instance, method 400 continues at 435, and no change is made to the memory management table. In either instance, method 400 returns to 405, where operations are continued to be monitored.

Figure 5:
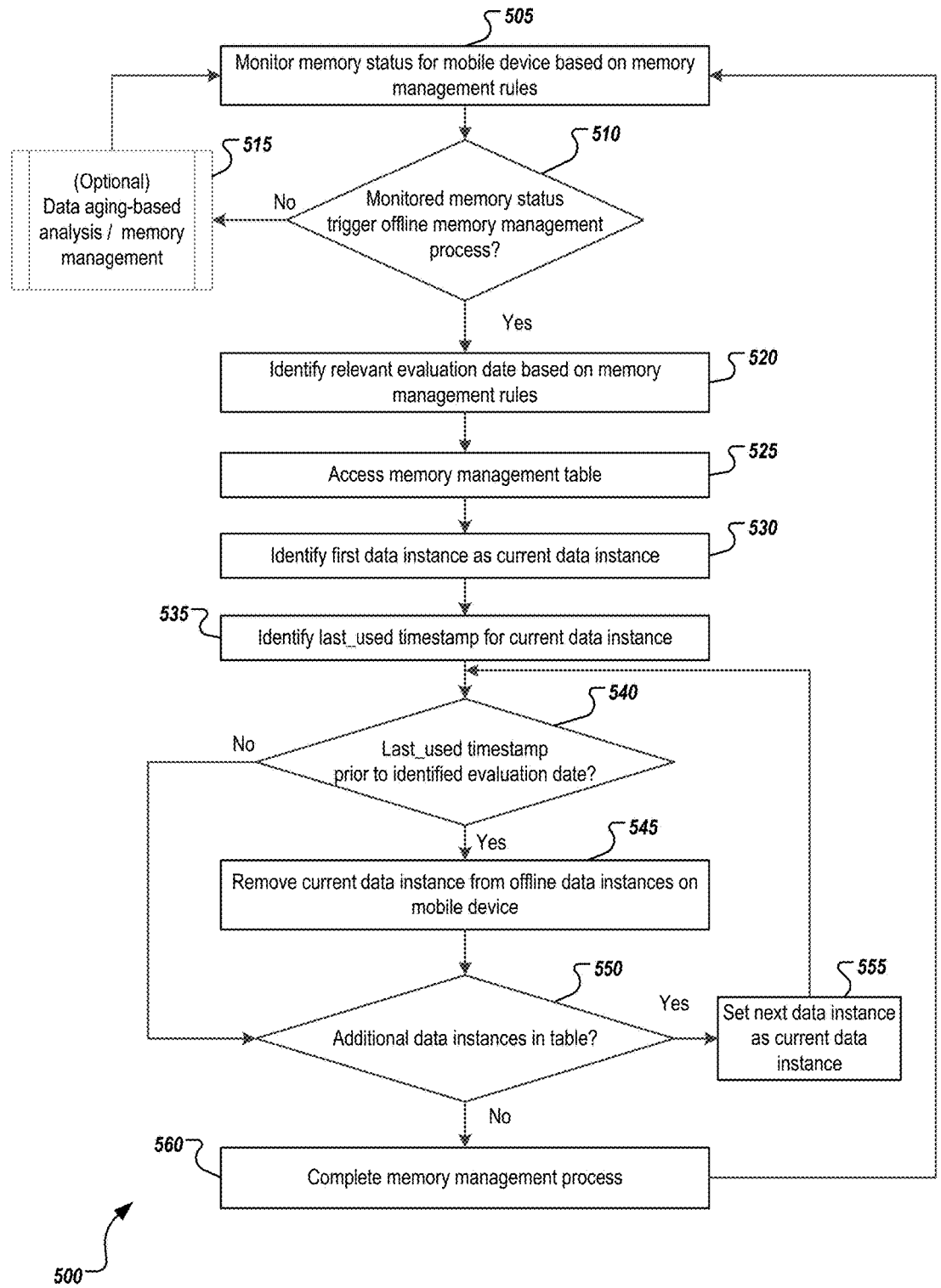
FIG. 5 is a flowchart of example operations associated with a memory management process used for offline lifecycle management of stored data based on a current status of the memory of the mobile device.

FIG. 5 is a flowchart of example operations 500 associated with a memory management process used for offline lifecycle management of stored data based on a current status of the memory of the mobile device. For clarity of presentation, the description that follows generally describes method 500 in the context of the system 100 illustrated in FIG. 1. However, it will be understood that method 500 may be performed, for example, by any other suitable system, environment, software, and hardware, or a combination of systems, environments, software, and hardware as appropriate.

At 505, a memory status for a mobile device can be monitored based on a pre-defined set of memory management rules. Those rules can determine particular memory statuses that may trigger an offline memory management process, and can include, among other examples, a determination that a threshold percentage of storage space has been used in total or that a threshold percentage of storage space allocated to a particular mobile application associated with the offline data has been exceeded. In some alternative implementations, the memory management process may be triggered periodically (e.g., once per week and/or month) or via a manual indication from the mobile device's user or a remote administrator, as well as other suitable triggering events, actions, or determinations.

Figure 6:
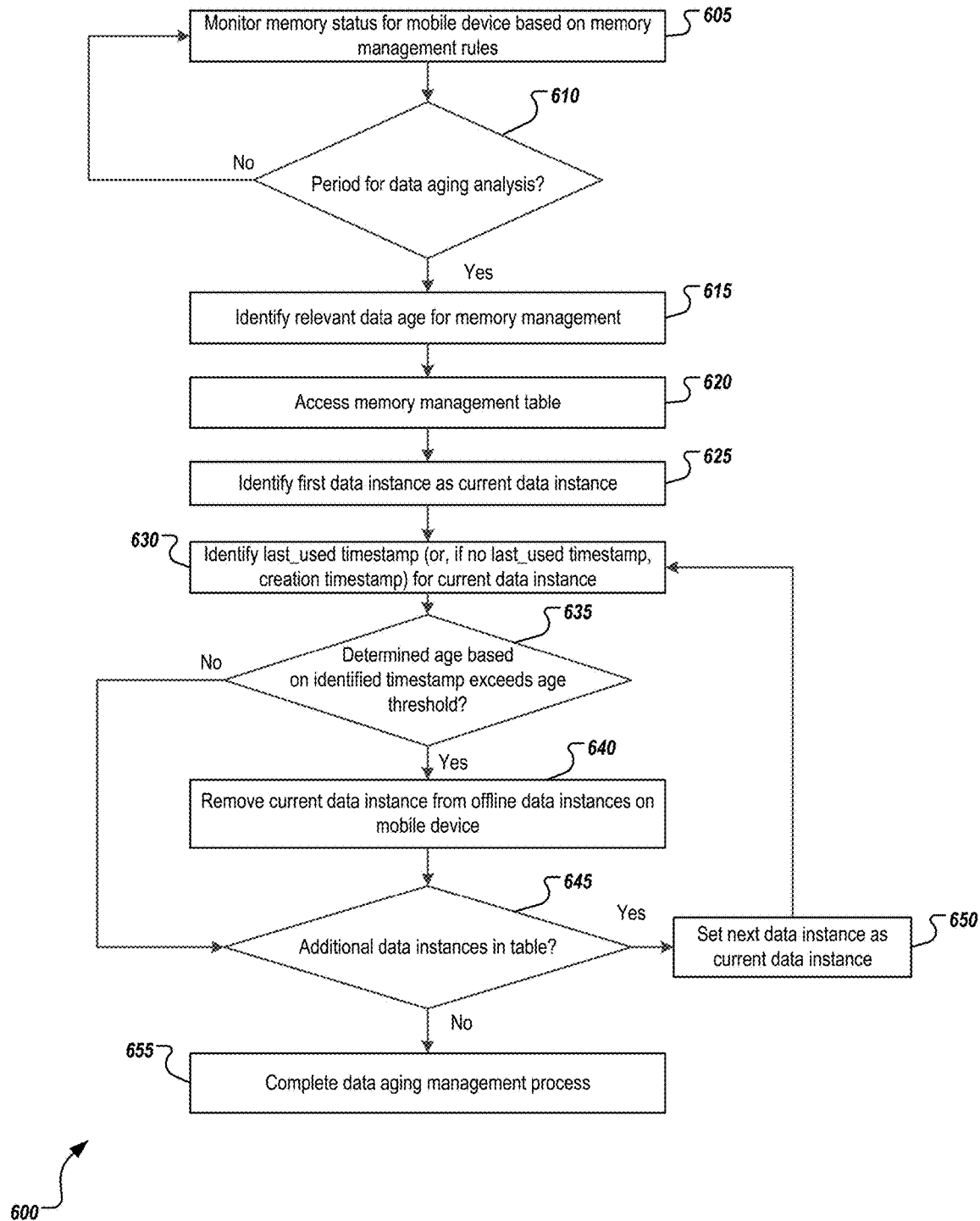
FIG. 6 is a flowchart of example operations associated with an age-based memory management process used for offline lifecycle management of stored data based on an age associated with offline data stored in the memory of the mobile device.

At 510, a determination is made as to whether the monitored memory status is such that the offline memory management process is triggered. If not, method 500 moves to 515, where an optional data aging-based memory management process may be performed in some instances. FIG. 6 provides a further discussion of the age-based review. Method 500 continues and returns to 505 for further monitoring.

If, however, the determination is made that the monitored memory status triggers the offline memory management process, then method 500 continues at 520. At 520, a relevant evaluation date based on the memory management rules can be identified. The relevant date may be a certain time period prior to the current time, where prior to the relevant data, potential removal of data from the mobile device may be considered by the memory management process. For example, if the trigger occurs in December, a three-month time period may be used such that the threshold date for potential removal from the mobile device may be the prior September. In those instances, any data instances associated with a last_used timestamp prior to September may be considered stale and removable absent any particular rule or user indication that one or more of those data instances should be maintained on the device. In some instances, the relevant data may differ based on a role of the user of the mobile device (e.g., one or more data instances may be important and need to be maintained over different time periods, a predefined indication or preference of the user not to remove certain data instances, etc.). Once the relevant evaluation date is identified, method 500 continues to 525, where a memory management table (e.g., an offline data instance table 200) is accessed.

A first data instance from the table is identified as a current data instance at 530. At 535, the last_used timestamp for the current data instance is identified. At 540, a determination is made as to whether the identified last_used timestamp of the current data instance is prior to or older than the identified evaluation date. If so, the current data instance may be removed from the offline data instances stored on the mobile device at 545, and method 500 continues to 550. In some instances, the current data instance may instead be moved to a list for potential removal. Once the entire set of data instances are evaluated, those data instances identified for potential removal can be compared relative to each other to determine which may be removed. Such ranking may be used to remove only a subset of the data instances instead of all, such as where removal of a subset moves the mobile device's memory outside of the memory status associated with the memory management process. In some instances, the ranking may be based solely on the relative lengths of non-access, while in others, an evaluation of importance may include considerations outside of the length of non-access, and can include the original creation timestamp of the various data instances and the type of data in the data instances (e.g., in light of the role of the user, the user's historical data instance usage, or any other suitable consideration), among others.

Returning to illustrated FIG. 5, if the last_used timestamp does not fall prior to the identified evaluation date, then method 500 continues at 550. At 550, a determination is made as to whether any additional data instance entries are included in the memory management table. If so, the next data instance is set as the current data instance at 555, and method 500 returns to 540. If no additional data instance entries exist, then at 560 the memory management process completes and method 500 returns to 505 for continued monitoring of the memory status. In some instances, the removal of particular data instances from the mobile device may be delayed until 560, when each of the identified data instances are removed at once, or where a subset of the data instances are removed (e.g., a number of relatively older data instances are removed to move the memory into the non-triggered status).

FIG. 6 is a flowchart of example operations 600 associated with an age-based memory management process (illustrated at 515 of FIG. 5) used for offline lifecycle management of stored data based on an age associated with offline data stored in the memory of the mobile device. For clarity of presentation, the description that follows generally describes method 600 in the context of the system 100 illustrated in FIG. 1 and the operations of FIG. 5. However, it will be understood that method 600 may be performed, for example, by any other suitable system, environment, software, and hardware, or a combination of systems, environments, software, and hardware as appropriate.

At 605, a memory status for the mobile device based on the memory management rules is monitored as it relates to a data aging-based memory management process. The data aging-based memory management process can be performed in connection with a triggered memory management process based on a memory's status, on a schedule independent of the triggered memory management process, or in response to particular event triggers separate from the triggers described in FIG. 5, among others. In some instances, the data aging-based process may be performed each time the memory management process 500 is performed.

At 610, a determination is made as to whether the period for performing the data aging-based analysis has occurred, or whether the data aging-based analysis should be performed for another reason. If so, method 600 continues to 615. However, if it is determined that the data aging-based process is not to occur, method 600 can return to 605 to await the triggering of another potential aging-based analysis.

At 615, a relevant data age is identified for the purposes of the memory management process. The relevant data age may be, in some instances, farther back in time as compared to the threshold analysis of FIG. 5, as the data aging-based memory management may be concerned with significantly stale data that can be removed from the mobile device. As the data aging-based process can be triggered even outside of the memory status-based processes (e.g., periodically), the lifecycle management for the data aging solution may not require an immediate issue to execute. In some instances, the relevant data age may be based on a time since a last_access timestamp, while in others the relevant data age may be associated with the creation timestamp for data instances. In some instances, as well, different types of data instances may be associated with different rules, including rules based on or influenced by the role associated with the user of the mobile device.

At 620, the memory management table storing the metadata for the offline data instances can be accessed. A first data instance is identified as the current data instance at 625, and a last_used timestamp (or a creation timestamp) associated with the current data instance is identified at 630. At 635, a determination is made as to whether the determined age of the current data instance exceeds the aging threshold determined at 615. If the age threshold is exceeded, method 600 continues at 640, where the current data instance is removed from the offline data instances of the mobile device (or alternatively, is identified as a potential removal). Method 600 can then continue at 645. If a determination is made that the age of the current data instance's timestamps does not exceed the age threshold, then method 600 can move from 635 to 645.

At 645, a determination is made as to whether any additional data instance entries are included in the memory management table. If so, the next data instance is set as the current data instance at 650, and method 600 returns to 630. If no additional data instance entries exist, then at 655 the memory management process completes. In some instances, the removal of particular data instances from the mobile device may be delayed until 655, when each of the identified data instances are removed at once, or where a subset of the data instances is removed (e.g., a number of relatively older data instances are removed to move the memory into the non-triggered status).

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method executed by hardware processors, the method comprising:
    monitoring a set of offline data instances stored at a mobile device associated with a mobile application, the mobile application associated with a set of memory management rules for offline data instances associated with the mobile application;
    maintaining, by a memory management process associated with the mobile application, an offline data instance table identifying each of the set of monitored offline data instances stored at the mobile device, each offline data instance associated with a timestamp identifying a most recent time of access of a corresponding offline data instance, where the most recent time of access corresponds to a most recent time of access corresponding to a direct interaction or presentation of information from a detailed data object associated with the corresponding offline data instance, wherein the maintaining includes not updating the most recent time of access when a summary presentation of the corresponding offline data instance occurs; and
    in response to determining that a trigger associated with performing a memory management process has occurred based on the set of memory management rules:
    identifying, by the memory management process and from the set of memory management rules, a period of time parameter since a last access of individual data instances corresponding to a deletion action;
    comparing, by the memory management process and from the set of memory management rules, the identified period of time parameter to a current time and the most recent time of access for each of the set of offline data instances; and
    deleting, by the memory management process and from the set of memory management rules, at least a subset of the set of offline data instances wherein an amount of time since the most recent time of access for a particular offline data instance meets or exceeds the period of time parameter.

2. The method of claim 1, wherein at least some of the offline data instances comprise data objects.

3. The method of claim 1, wherein each offline data instance is further associated with a timestamp identifying an original creation date at the mobile device of the corresponding offline data instance.

4. The method of claim 3, the method further comprising, in response to determining that a trigger associated with performing a memory management process has occurred based on the set of memory management rules:
    identifying, by the memory management process and from the set of memory management rules, a threshold age of particular offline data instances corresponding to a deletion action;
    comparing, by the memory management process, the identified threshold age to a current age for each of the set of offline data instances based on their respective creation timestamp or the most recent time of access; and
    deleting, by the memory management process and from the set of memory management rules, at least a subset of the set of offline data instances wherein the age of a particular offline data instance meets or exceeds the identified threshold age of the particular offline data instances.

5. The method of claim 1, wherein deleting the at least a subset of the set of offline data instance comprises deleting each of the set of offline data instances wherein the amount of time since the most recent time of access for a particular offline data instance meets or exceeds the period of time parameter.

6. The method of claim 1, wherein the summary presentation of the corresponding offline data instance includes a presentation of the corresponding offline data instance in a list of offline data instances.

7. The method of claim 1, wherein:
the direction interaction for a first offline data instance comprises presentation, in a user interface, of the first offline data instance as a primary data instance;
the summary presentation for a second offline data instance comprises presentation, in the user interface concurrently with the first offline data instance, of the second offline data instance as a non-primary data instance; and
the maintaining includes updating the most recent time of access for the first offline data instance and not updating the most recent time of access for the second offline data instance.

8. A system comprising:
at least one processor; and
a memory communicatively coupled to the at least one processor, the memory storing instructions which, when executed, cause the at least one processor to perform operations comprising:
monitoring a set of offline data instances stored at a mobile device associated with a mobile application, the mobile application associated with a set of memory management rules for offline data instances associated with the mobile application;
maintaining, by a memory management process associated with the mobile application, an offline data instance table identifying each of the set of monitored offline data instances stored at the mobile device, each offline data instance associated with a timestamp identifying a most recent time of access of a corresponding offline data instance, where the most recent time of access corresponds to a most recent time of access corresponding to a direct interaction or presentation of information from a detailed data object associated with the corresponding offline data instance, wherein the maintaining includes not updating the most recent time of access when a summary presentation of the corresponding offline data instance occurs; and
in response to determining that a trigger associated with performing a memory management process has occurred based on the set of memory management rules:
identifying, by the memory management process and from the set of memory management rules, a period of time parameter since a last access of individual data instances corresponding to a deletion action;
comparing, by the memory management process and from the set of memory management rules, the identified period of time parameter to a current time and the most recent time of access for each of the set of offline data instances; and
deleting, by the memory management process and from the set of memory management rules, at least a subset of the set of offline data instances wherein an amount of time since the most recent time of access for a particular offline data instance meets or exceeds the period of time parameter.

9. The system of claim 8, wherein each offline data instance is further associated with a timestamp identifying an original creation date at the mobile device of the corresponding offline data instance.

10. The system of claim 9, the operations further comprising, in response to determining that a trigger associated with performing a memory management process has occurred based on the set of memory management rules:
identifying, by the memory management process and from the set of memory management rules, a threshold age of particular offline data instances corresponding to a deletion action;
comparing, by the memory management process, the identified threshold age to a current age for each of the set of offline data instances based on their respective creation timestamp or the most recent time of access; and
deleting, by the memory management process and from the set of memory management rules, at least a subset of the set of offline data instances wherein the age of a particular offline data instance meets or exceeds the identified threshold age of the particular offline data instances.

11. The system of claim 8, wherein deleting the at least a subset of the set of offline data instance comprises deleting each of the set of offline data instances wherein the amount of time since the most recent time of access for a particular offline data instance meets or exceeds the period of time parameter.

12. A non-transitory computer-readable storage medium storing instructions which, when executed, cause at least one processor to perform operations comprising:
monitoring a set of offline data instances stored at a mobile device associated with a mobile application, the mobile application associated with a set of memory management rules for offline data instances associated with the mobile application, wherein at least some of the offline data instances comprise data objects;
maintaining, by a memory management process associated with the mobile application, an offline data instance table identifying each of the set of monitored offline data instances stored at the mobile device, each offline data instance associated with a timestamp identifying a most recent time of access of a corresponding offline data instance, where the most recent time of access corresponds to a most recent time of access corresponding to a direct interaction or presentation of information from a detailed data object associated with the corresponding offline data instance, wherein the maintaining includes not updating the most recent time of access when a summary presentation of the corresponding offline data instance occurs; and
in response to determining that a trigger associated with performing a memory management process has occurred based on the set of memory management rules:
identifying, by the memory management process and from the set of memory management rules, a period of time parameter since a last access of individual data instances corresponding to a deletion action;
comparing, by the memory management process and from the set of memory management rules, the identified period of time parameter to a current time and the most recent time of access for each of the set of offline data instances; and
deleting, by the memory management process and from the set of memory management rules, at least a subset of the set of offline data instances wherein an amount of time since the most recent time of access for a particular offline data instance meets or exceeds the period of time parameter.

\* \* \* \* \*